(12) United States Patent
Koike et al.

(10) Patent No.: US 6,811,334 B2
(45) Date of Patent: Nov. 2, 2004

(54) TRANSMISSION CONTROL DEVICE AND TRANSMISSION CONTROL METHOD FOR A TERMINAL APPARATUS

(75) Inventors: Toshiaki Koike, Shiojiri (JP); Hidetake Mochizuki, Azusagawa-mura (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 10/026,339

(22) Filed: Dec. 20, 2001

(65) Prior Publication Data

US 2002/0098027 A1 Jul. 25, 2002

(30) Foreign Application Priority Data

Dec. 20, 2000 (JP) ........................................ 2000-387319

(51) Int. Cl.[7] .............................................. B41J 11/44
(52) U.S. Cl. ............................ 400/61; 400/70; 400/76
(58) Field of Search .............................. 400/76, 70, 61

(56) References Cited

U.S. PATENT DOCUMENTS

| | | | |
|---|---|---|---|
| 5,802,546 A | 9/1998 | Chisholm et al. | |
| 6,389,544 B1 * | 5/2002 | Katagiri | 713/300 |
| 6,434,643 B1 * | 8/2002 | Ejiri | 710/58 |
| 6,612,759 B2 * | 9/2003 | Fukano et al. | 400/74 |
| 2001/0004241 A1 * | 6/2001 | Fukano et al. | 340/692 |
| 2001/0021954 A1 * | 9/2001 | Takamizawa et al. | 710/19 |
| 2002/0138612 A1 * | 9/2002 | Sekizawa | 709/224 |
| 2003/0135664 A1 * | 7/2003 | Hayashi et al. | 709/321 |

FOREIGN PATENT DOCUMENTS

| | | | | |
|---|---|---|---|---|
| JP | 59-229658 | 12/1984 | | |
| JP | 61-125258 | 6/1986 | | |
| JP | 2000056868 A | * 2/2000 | ............. | G06F/1/28 |

* cited by examiner

Primary Examiner—Charles H. Nolan, Jr.
(74) Attorney, Agent, or Firm—Rosalio Haro

(57) ABSTRACT

A status data transmission control apparatus and method reduces the buffer size needed for transmission and significantly reduces the communication load by storing the most recent status data (of continuously generated status data) and a history of status data changes in a dedicated buffer. The most recent status data and the history of changes leading up to the most recent status data are sent to the host.

18 Claims, 8 Drawing Sheets

DATA CHANGES (8BIT'S)

| | MOST RECENTLY GENERATED DATA (TRAN) | HISTORY DATA (MID) | MOST RECENTLY STORED DATA (NEW) |
|---|---|---|---|
| DATA 1 | 0 0 0 0 0 0 0 1 | | 0 0 0 0 0 0 0 1 |
| DATA 2 | 0 0 0 0 0 0 1 0 | 0 0 0 0 0 0 1 1 | 0 0 0 0 0 0 1 0 |
| DATA 3 | 0 0 0 0 0 1 0 0 | 0 0 0 0 0 1 1 1 | 0 0 0 0 0 1 0 0 |
| DATA 4 | 0 0 0 0 1 0 0 0 | 0 0 0 0 1 1 1 1 | 0 0 0 0 1 0 0 0 |
| DATA 5 | 0 0 0 1 0 0 0 0 | 0 0 0 1 1 1 1 1 | 0 0 0 1 0 0 0 0 |
| DATA 6 | 0 0 0 0 0 0 0 1 | 0 0 0 1 1 1 1 1 | 0 0 0 0 0 0 0 1 |

FIG. 7

TRANSMISSION CONTROL DEVICE AND TRANSMISSION CONTROL METHOD FOR A TERMINAL APPARATUS

BACKGROUND OF THE INVENTION

1. Field of the Invention

The present invention relates generally to terminal apparatuses such as printers, displays, and cash deposit devices used in automated teller machines (ATM), cash dispensers (CD), POS systems, and bank kiosks located in convenience stores, and relates more particularly to a transmission control device and transmission control method for sending data from such a terminal apparatus to a host system.

2. Description of the Related Art

ATMs, cash dispensers, POS terminals, bank kiosks, and other such systems typically have a main control device such as a personal computer (referred to below as a PC or host system) and multiple terminal devices, such as printers, display devices, cash dispensers, storage devices, and bar code readers, connected to and controlled by the host system. The host systematically controls the overall operation of the various internal terminal devices in order to achieve the desired functionality of the ATM, POS system, or other system. More specifically, the host and terminal devices are connected by a data communication line, enabling the host to send control commands and other data to the terminal devices and thereby control terminal device operation. The terminal devices send data to the host according to the terminal device function, and, when requested by the host, send a status report indicating the operating status of the terminal device to the host. Most of the terminal devices installed in the system connect to the host through a serial port (such as RS-232C) used to exchange process data and commands between the host and terminal devices.

An interface device is located between the various system components, and a control line is provided for controlling communications. A terminal device, for example, can use a data terminal ready (DTR) signal to notify the host of whether or not it is ready to receive data. When the DTR signal goes active (active state), the host sets the data set ready (DSR) signal active, and sends data after confirming that both sides are in an operating state. This makes it possible to prevent data from being dropped during data communication.

The present invention is applicable to all terminals, but to simplify the following description, it is exemplarily described as applied to a printer, which is a terminal device that is frequently used in ATMs, POS systems, and the like.

A printer typically cannot print if there is an internal shortage of any necessary printing supplies, such as printing paper or ink. It has therefore been made possible for the host to be able to confirm how much printing paper and ink remains available to the printer. More specifically, the printer is configured to send ink-near-end or paper-near-end status data to the host if the remaining printing paper or ink supply becomes low, and to send ink-end or paper-end status data if the supply is completely depleted. Various other status data may be sent to the host in addition to the above examples, including printer-cover-open, ink-tank-removed, paper-jam, and power-supply status data.

The printer may become unable to operate as a terminal (a state referred to below as being off-line) if, for example, its receive buffer becomes full (a receive-buffer-full status), a paper jams, or other error occurs such as the printer cover being open. If the printer, that is, the terminal device, goes off-line, it is necessary to notify the host of the terminal's off-line status and interrupt, i.e. stop, the sending of data from the host to the off-line terminal.

Data is sent to the host in response to a status request command from the host, and there are different types of status request commands. To confirm a terminal device's status, for example, the host may send a command to an individual terminal device to have the status information sent from that terminal device. Additionally, the terminal device may use a function for sending status data automatically to the host whenever there is a change in a particular status (referred to below as an Automatic Status Back (ASB) function).

A data transmission control apparatus according to the prior art is described in further detail below with reference to FIG. 8. FIG. 8 is a function block diagram showing only the major parts of a printer 70 according to the prior art. The host 90 controls the overall POS system. Though not shown in FIG. 8, numerous terminal devices such as a display device and cash drawer (not shown in the figure) required to achieve the functions of a POS system are connected to the host 90 in addition to printer 70, and the host controls these terminal devices by exchanging data with the terminal devices.

The printer 70 is controlled by sending control commands and data from the host 90 to the printer 70. A personal computer with a general purpose operating system can be used in the host 90. In order to control the printer 70, the host 90 can send a command telling the printer 70 to report its condition (status). In response to the command from the host 90, the printer 70 then sends the requested status.

The host 90 and printer 70 are connected through a serial communications port (RS-232C) driver, for example. Printer control commands and other data sent from the host 90 are received through the receive driver 71 by the receive unit 72. Received data is saved (stored) to a receive buffer (not shown in the figure) in the receive unit 72. Data saved to the receive buffer is interpreted by the command interpreter 73 in the order it was saved to the receive buffer.

The command interpreter 73 interprets and executes the commands. For example, if a print command is received the command interpreter 73 prepares the print data in a print buffer (not shown in the figure), and the data is then printed by head driver 76 and print mechanism 77 under the control of the print controller 74. A motor driver 75 handles transporting the print paper (not shown in the figure) and moving the head carriage (not shown in the figure).

A status monitor 80 is connected to a power supply voltage detector 81, paper detector 82, ink detector 83, cover detector 84, switch detector 85 for detecting paper jams, and other detectors 86, and monitors the internal condition of the printer 70. An abnormal supply voltage, the presence and amount of remaining printing paper, the presence and amount of remaining ink, whether the covers are open or closed, the occurrence of any paper jams, carriage drive errors, the receive buffer being full, and other printer conditions are detected by detectors 81 to 86 and passed to the status monitor 80.

The print status, receive buffer full status, and other status reports are also passed to the status monitor 80 by the print controller 74 and receive unit 72, for example.

When a status request command is sent from the host 90, it is passed through the receive unit 72 and interpreted by the command interpreter 73, and status information is then sent from status monitor 80 through the data transmission driver 78 to the host 90.

The status of the printer 70 is sent to the host 90 even when the ASB function is used. By first enabling the ASB function, the host 90 can be automatically informed of certain printer conditions (status), including errors, cover open status, paper position, and remaining ink quantity.

The status data may be only one byte long or may be several bytes. If it is one byte, that is, 8 bits, eight types of status data can be communicated, and as the byte count increases so does the amount of status data. A case in which ASB status data that is four bytes long is sent to the host 90 is described next.

If the ASB function is enabled and there is a change in a specified status, the status monitor 80 assembles a particular status report of four bytes and sends it through data transmission driver 78 to the host 90. Note that when starting a transmission, the terminal first checks whether the host 90 can receive data, and starts transmission if the host is not in a state in which it is unable to receive data (referred to below as a busy state).

Status data such as described above is sent sequentially to the host as communication data. Furthermore, because ASB and other status data is sent automatically to the host whenever there is a change in status, status data may be sent one after another. The problem is that this could cause the transmission buffer of the terminal device to become full (resulting in a buffer-full state), making it unable to store further information and possibly result in the loss of status data generated after the buffer becomes full.

OBJECTS OF THE INVENTION

An object of the present invention is therefore to provide a transmission control device and transmission control method enabling transmission to the host without losing status data generated continuously by the terminal device.

Another object of the present invention is to provide a status data transmission control method whereby a smaller transmission buffer can be used and the communication load can be significantly reduced.

SUMMARY OF THE INVENTION

By providing a dedicated buffer for storing continuously generated status data and storing at least the most recent status data and a status change history, and sending to the host only the most recent status data and the history of status changes leading thereto, the present invention provides a status data transmission control method able to reduce the buffer needed for transmission and greatly reduce the communication load. As a result, a history of status changes can be reliably stored and transmitted using a small amount of data.

More specifically, a transmission control device according to a first aspect of the invention has a transmission buffer for temporarily storing continuously generated status data; a dedicated buffer for temporarily storing at least the most recent status data and a history of status data change when the transmission buffer is full; a status-change history generating unit for generating history data indicating the presence of a change in status for the plural status data received continuously by the dedicated buffer; and a control means for controlling storing successive status data to the dedicated buffer when the transmission buffer becomes full, and outputting the status data stored to the dedicated buffer and the history data to the transmission buffer, and transmitting the transmission data and history data stored to the transmission buffer to an external device, when the buffer full state of the transmission buffer is cancelled.

Status changes can thus be stored using a minimal amount of data space when the transmission buffer becomes full, and the transmission load can therefore be lightened. Status data generated continuously by a terminal device can be sent to the host without loss. A smaller buffer can therefore be used for transmission, and a status data transmission control method able to greatly reduce the communication load can be provided. A status change history can also be reliably stored and sent using a minimal amount of data space. The status change history can also be sent reliably to the host without loss.

The status data stored into the dedicated buffer and for which history data is generated by the status-change history generating unit preferably consists of specific predetermined status data types. Status change history data can thus be selectively generated and sent based on importance, for example.

Further preferably, the status data represents one status with one bit, and the status-change history generating unit generates the status-change history by sequentially calculating the bitwise logical OR of the identified status bit changes in the received status data with the previously stored status data. Status change history data can thus be calculated and stored using a simple configuration.

Yet further preferably, the transmission control device also has a separate history data storage means for storing the history data, and the control means controls stores the history data to the separate history data storage means instead of to the dedicated buffer. It is thus possible to provide a separate storage means and save to the separate storage means other than the dedicated buffer.

Yet further preferably, the transmission control device also has a first dedicated buffer of a first-in, first-out (FIFO) type for storing the status data, and a second dedicated buffer for storing history data generated according to status data output from a last stage of the first dedicated buffer and the most recent status data output from the last stage of the first dedicated buffer. The status-change history generating unit generates history data based on status data output from the first dedicated buffer. The control means controls transferring status data and history data from the second dedicated buffer to the transmission buffer when the status data and history data are stored to the second dedicated buffer, and transferring the status data in the order stored from the first dedicated buffer to the transmission buffer when the status data is not stored to the second dedicated buffer.

By thus storing a specific amount of status data to the first dedicated buffer and storing status change history data when the first dedicated buffer becomes full, all status data content can be stored to the storage capacity of the first dedicated buffer.

A transmission control method according to a further aspect of the present invention has (a) a step for confirming if the transmission buffer is full, and storing continuously generated status data to the transmission buffer if the transmission buffer is not full; (b) a step for generating, when the transmission buffer is full, history data indicating the presence of a change in successive status data that cannot be stored to the transmission buffer; (c) a step for storing at least the most recent status data and the history data; and (d) a step for transferring the stored most-recent status data and the history data to the transmission buffer when the buffer full state of the transmission buffer is cancelled.

The status data processed in step (b), step (c), and step (d) preferably consists of specific predetermined status data types.

Further preferably, the status data processed in step (b), step (c), and step (d) represents one status with one bit; and step (b) for generating history data has a step for generating history data by sequentially calculating a bitwise logical OR of the continuously received status data.

A transmission control method according to a further aspect of the present invention has (a) a step for confirming if the transmission buffer is full, and storing continuously generated status data to the transmission buffer if the transmission buffer is not full; (b) a step for storing status data that cannot be stored to the transmission buffer when the transmission buffer is full to a first dedicated buffer of a first-in, first-out (FIFO) type; (c) a step for generating history data indicating presence of a status change in the status data output continuously from a last stage of the first dedicated buffer; (d) a step for storing at least the history data and most recent status data that is status data output from the last stage of the first dedicated buffer; and (e) a step for transferring status data and history data from the second dedicated buffer to the transmission buffer if the status data and history data are stored to the second dedicated buffer when the buffer full state of the transmission buffer is cancelled, and transferring the status data in the order stored from the first dedicated buffer to the transmission buffer if the status data is not stored to the second dedicated buffer.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 7 shows the changes in the most recently generated, and transferred data (Tran), history data (Mid), and most recently stored data (New).

DESCRIPTION OF THE PREFERRED EMBODIMENTS

A preferred embodiment of the present invention is described below with reference to the accompanying figures. As noted above, the present invention can be used with various types of terminal devices, but is described in the exemplary preferred embodiment below as applied to a printer, a type of terminal device that is frequently used in ATM, POS, and kiosk terminals, and that sends and receives a large amount of data to and from a host, as well as having numerous status types. The invention is even more particularly described below with reference to a printer used in a POS system.

Figure 1:
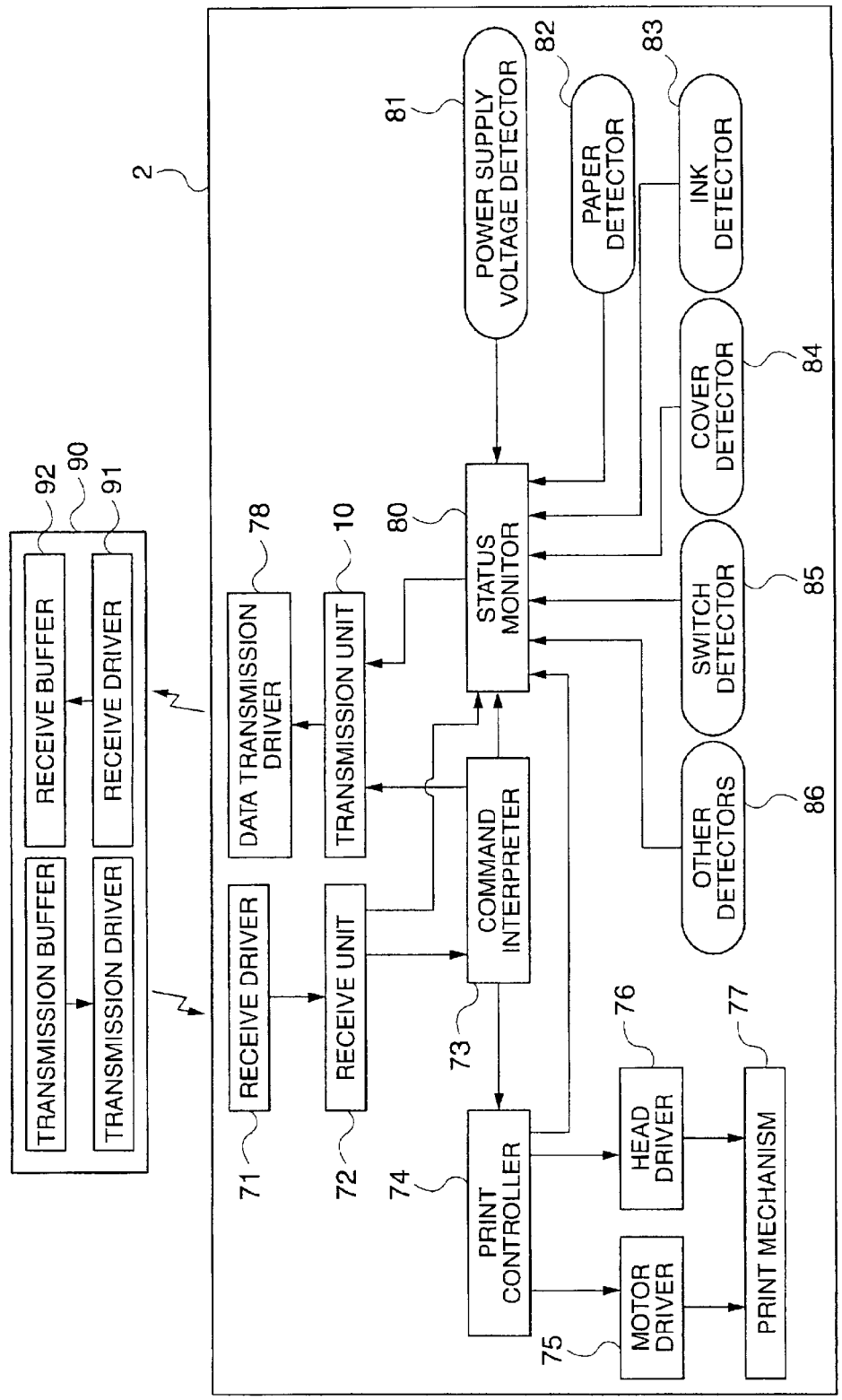
FIG. 1 is a function block diagram of a printer 2 according to a preferred embodiment of the present invention.
Figure 8:
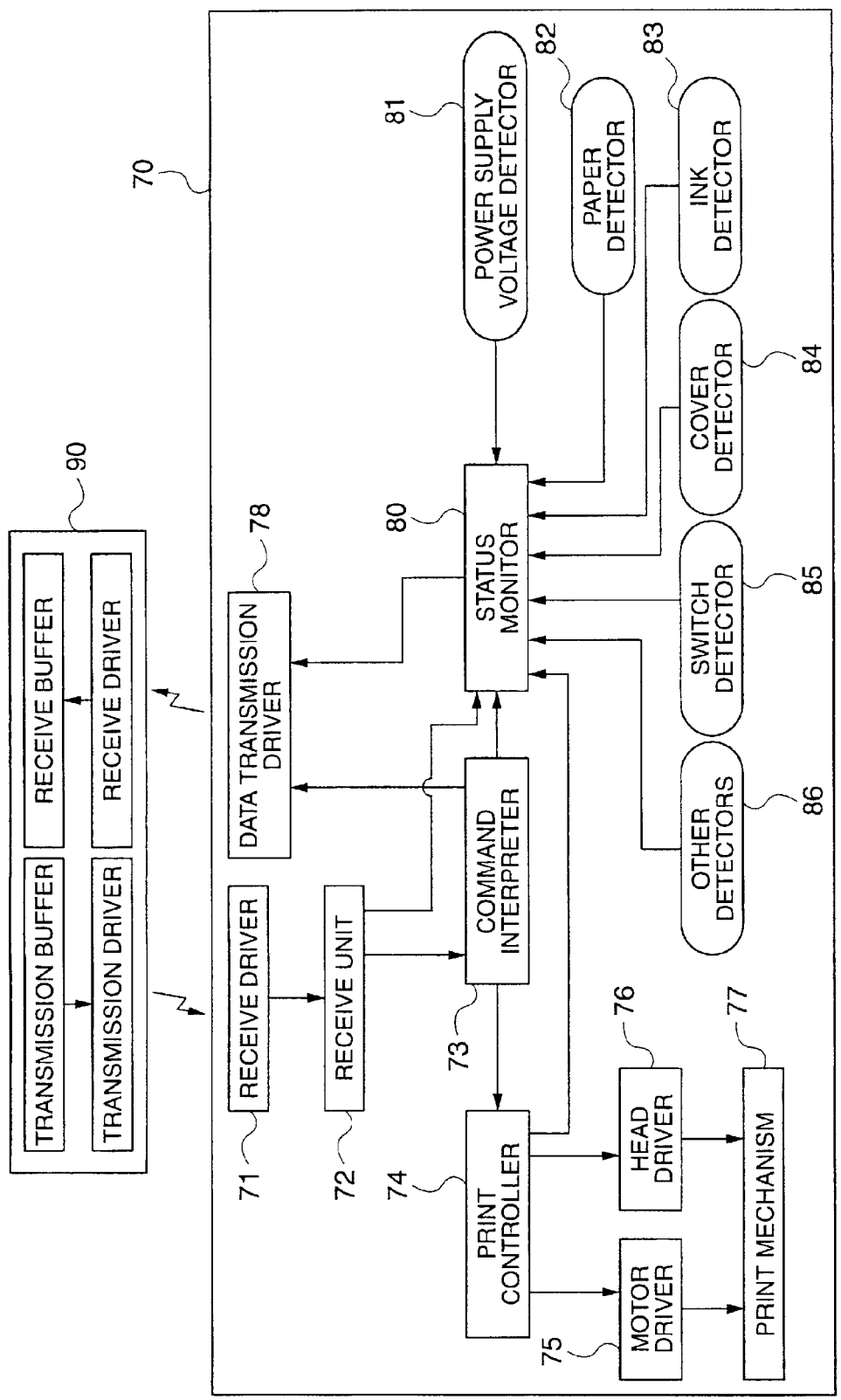
FIG. 8 is a function block diagram showing the major parts of a printer 70 according to the prior art.

FIG. 1 is a function block diagram of a printer 2 according to a preferred embodiment of the invention. Only the major parts of the printer are shown in the function block diagram of FIG. 1. The configuration of printer 2 shown in FIG. 1 differs from printer 70 in FIG. 8 in the addition of a transmission unit 10 for controlling the sending of data from printer 2 to host 90. Note that like parts in FIG. 8 and FIG. 1 are identified by like reference numerals, and further description thereof is omitted below.

When sending data from printer 2 to host 90, the transmission unit 10 sends data while confirming whether the host 90 can receive the data in byte units. If the host 90 becomes busy while transmission is in progress, transmission is interrupted and the remaining data is sent when host 90 is again able to receive data.

Figure 2:
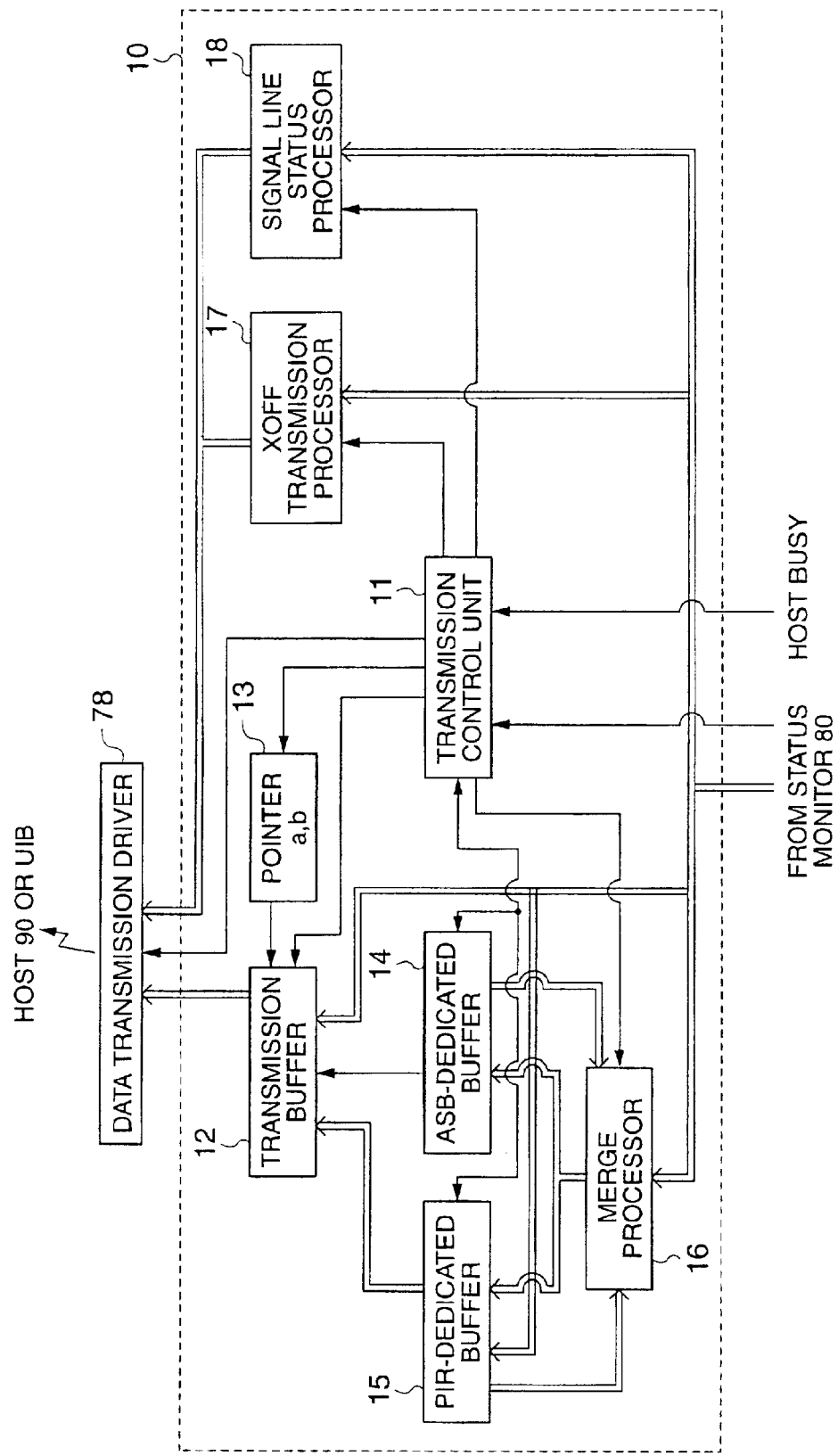
FIG. 2 is a function block diagram showing the basic configuration of the transmission unit of FIG. 1.

A preferred embodiment of a transmission unit 10 according to the present invention is described with reference to FIG. 2. The transmission unit 10 has a transmission control unit 11, transmission buffer 12, and pointer 13. When a control signal is sent to transmission control unit 11 and status data is simultaneously sent to transmission buffer 12 from status monitor 80 (of FIG. 1), the transmission control unit 11 determines if the host 90 is busy and sends the status data stored in the transmission buffer 12.

The transmission unit 10 in this example also has an ASB-dedicated buffer 14, a PIR-dedicated buffer 15, a merge processor 16, an XOFF transmission processor 17, and a signal line status processor 18. The ASB status is temporarily stored to the ASB-dedicated buffer 14 if any transmission data is saved in the transmission buffer 12. As already described, the ASB status is status data based on the automatic status report function (ASB), and in this embodiment consists of 4 bytes.

Process ID response, i.e. PIR, data is temporarily stored to PIR-Dedicated buffer 15 if any transmission data is saved in the transmission buffer 12. Note that PIR data is data that is sent according to the process ID optionally inserted by the host to control commands or print data sent to the printer, and indicates that the control command or print data was processed by the printer. This enables the host to send data synchronized to the internal state of the printer 2.

In this embodiment the transmission control unit 11 controls the sending of specific transmission data such as the XOFF signal and signal line status with higher priority than other transmission data. The XOFF transmission processor 17 sends a disable receive signal (XOFF) with highest priority from printer 2 to the host. The signal line status processor 18 sends status data to the host 90 to report when the printer 2 has gone off-line, and therefore transmits to the host with the next-highest priority to XOFF. The XOFF signal and signal line status are sent directly through data transmission driver 78 to the host 90 without passing through the transmission buffer 12.

When the ASB-dedicated buffer 14 or PIR-dedicated buffer 15 is full, the merge processor 16 generates status-change history data (referred to below as simply history data) for storing the most-recent status data and a history of status changes subsequent to the ASB-dedicated buffer 14 or PIR-dedicated buffer 15 becoming full.

The process of the transmission unit 10 receving status data is described next below. When status data and a control signal are sent from the status monitor 80 to transmission unit 10, the control signal is input to the transmission control unit 11 and the received status data is temporarily stored in transmission buffer 12. The storage capacity of the transmission buffer 12 can be determined as necessary and in this example is set to 128 bytes.

Pointer 13 includes a read pointer "a" indicating the location of the next data to be sent, and a write pointer "b" indicating the next storage location in the transmission buffer 12. The write pointer "b" is incremented when status data is temporarily stored in the transmission buffer 12. Note that both pointers are controlled to move within the address range of the transmission buffer 12, which is preferably implemented in RAM memory. That is, if a pointer is incremented to an address beyond the highest address in the address range, it is reset to the lowest value in the address range. This type of buffer structure is known as a "ring buffer."

In principle, the status data to be sent next when an opening becomes available in the transmission buffer 12 is saved if the transmission buffer is full. However, because of the nature of the ASB status data and PIR data, the amount of data to be stored could become very large if this type of data is generated frequently. Therefore, dedicated buffers 14 and 15 are respectively provided to temporarily store this data before transferring it to the transmission buffer 12.

Under specific conditions, such as when dedicated buffer 14 or 15 becomes full (buffer-full-state), a merge process is applied by the merge processor 16 according to the properties of the data to be stored, such as generating a history of changes in the ASB or other status data, and temporarily storing this history of changes together with the most recently occurring status data to dedicated buffers 14 and 15. Details of the merge process are described further below.

(Transmission Process for Normal Transmission Data)

The transmission process of the transmission unit 10 is described first below using FIG. 2 and FIG. 3. A flow chart of the transmission control process of transmission unit 10 is shown in FIG. 3.

Figure 3:
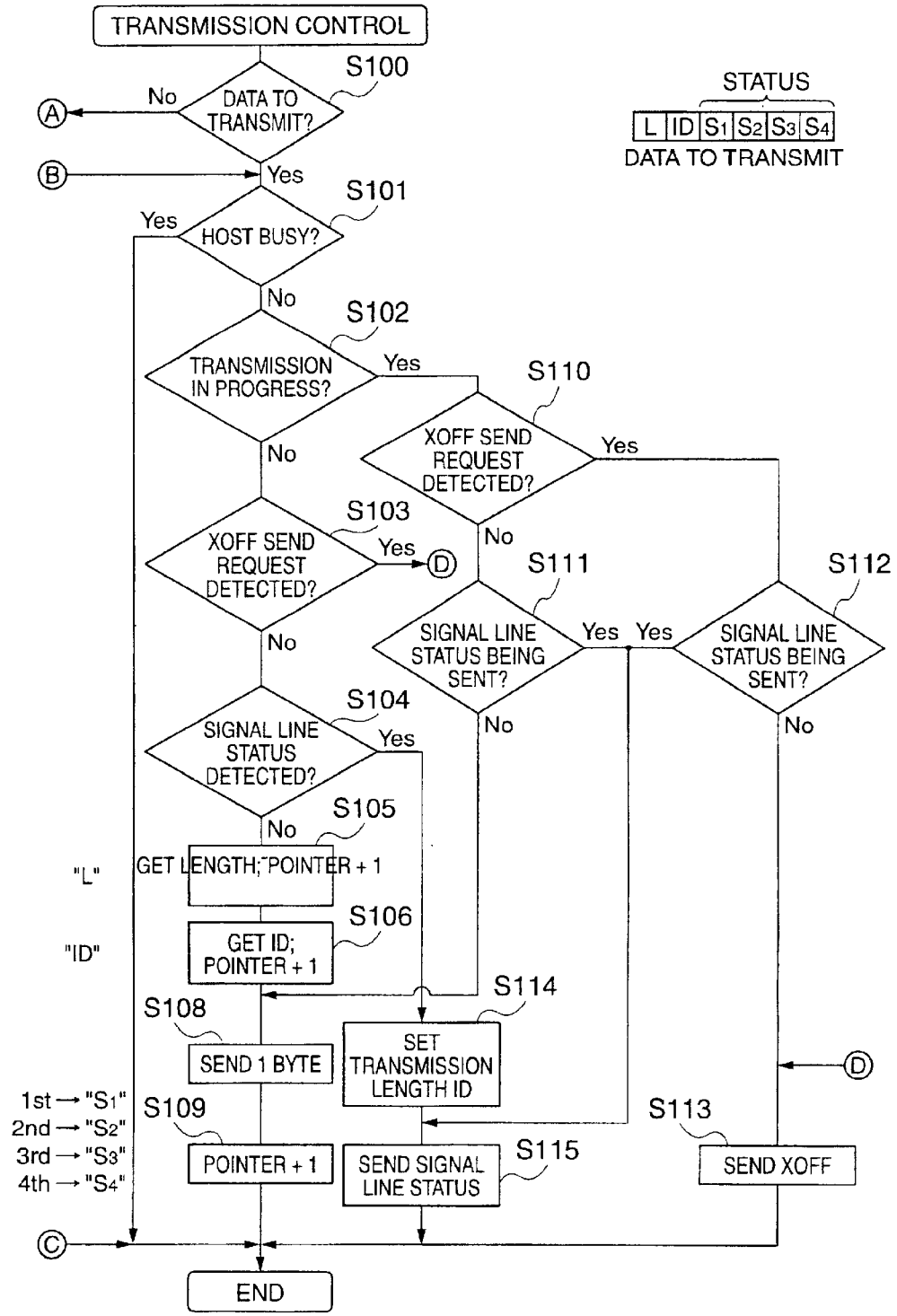
FIG. 3 is a flow chart used to describe the control operation of the transmission unit of FIG. 1.

The status table at the top right of FIG. 3 shows an example of data (L, ID, $S_1$, $S_2$, $S_3$, $S_4$) stored in transmission buffer 12, where data $S_1$, $S_2$, $S_3$, and $S_4$ are sent to the host 90.

The transmission control unit 11 determines if data is stored in transmission buffer 12. This can be determined by comparing the above-noted write pointer "b" and read pointer "a". If the values of pointers "a" and "b" are the same, then transmission buffer 12 is empty. If there is transmission data stored in transmission buffer 12 (S100; yes), then it is determined if the host 90 is busy (S101). If the host 90 is busy (S101; yes), the transmission process pauses until the host 90 can receive. If the host 90 is not busy (S101; no), transmission control unit 11 determines if the printer 2 is currently transmitting data (S102). In the case where the printer is not currently transmitting data (S102; no), because the transmission control unit 11 is attempting to start data transmission and is not in the midst of data transmission (S102; no), the procedure advances to step S103 and it is determined if there exists the presence of an XOFF send request. If there is no XOFF send request, it is then determined if a signal line status is detected (S104), and if neither is present (S103=no and S104=no), then the first data, that is length L of the status data to be sent, is read from transmission buffer 12 and pointer 13 is incremented (S105). Note that the status data length L obtained here is stored to RAM and used as the starting value of the loop counter for the current send loop. Data "ID" is read next from the transmission buffer 12 to determine the type of transmission data (status type, for example) (S106). In step S108 the next data, $S_1$, is read from transmission buffer 12 and sent to the host 90. The pointer 13 is then incremented to point to the next transmission data $S_2$, at which point the sending of 1 byte ends (S109). Note that the above-noted loop counter is decremented in this process.

The next 1 byte is then transmitted by the above process, that is, by repeating the main send loop. It is first determined whether there is any transmission data (S100). Because transmission data ($S_2$ to $S_4$) remains at this point, the procedure advances to step (S101), and it is then determined whether the host is busy (S101). If the host is busy, the transmission process pauses until the host is ready (S101; yes). If the host is not busy (S101; no), it is then determined whether data is being sent (S102). Whether data transmission is in progress can be determined based on whether or not the value of the above-noted loop counter is zero. If the loop counter is set to zero, then transmission is not in progress. In the present case because data is being sent (S102; yes), the procedure branches to steps S110 and S111, and the presence of the XOFF signal and signal line status are determined. If these are not detected (S110, no; S111, no), status data $S_2$ indicated by pointer 13 is read and sent to the host 90 (S108). When the sending of the 1 byte ends, pointer 13 is incremented in preparation for sending the next status data $S_3$ (S109). The status data count indicated by the status data length L can be sent by repeating the same process using the loop counter. Using the status data transmission example described above, status data $S_3$ and $S_4$ are sent to complete the transmission process for the transmission data sequence.

(XOFF Signal and Signal Line Status Transmission Process)

Operation when status data is being sent and an XOFF signal send request or signal line status send request is issued is described next. As shown in FIG. 2, the XOFF signal and signal line status are not stored to transmission buffer 12, and are sent directly through data transmission driver 78 to the host by XOFF transmission processor 17 and signal line status processor 18. The transmission process for this takes priority over the transmission data in transmission buffer 12. This is described using the transmission control flow chart shown in FIG. 3.

If an XOFF send request is detected while preparing to send the first status data $S_1$ (S103; yes), the procedure branches to D and the XOFF signal (1 byte) is sent with priority. If an XOFF signal send request is detected while sending the transmission data sequence $S_2$ to $S_4$ (S110; yes), the XOFF signal is sent unless the signal line status is being sent (S112; no). The XOFF signal is thus sent to the host 90 with the highest priority except when the signal line status is being sent.

If a signal line status is detected (S104; yes), the signal line status length (plural bytes can be defined) and ID are set (S114), and 1 byte of the signal line status is sent (S115). If there are plural signal line status bytes and the signal line status is being sent (S111 returns yes or S112 returns yes) after checking if the host is busy (S101), the remaining signal line status is sent sequentially one byte at a time (S115). As will be known from this control process, signal line status is sent with the next-highest priority to the XOFF signal.

Figure 4:
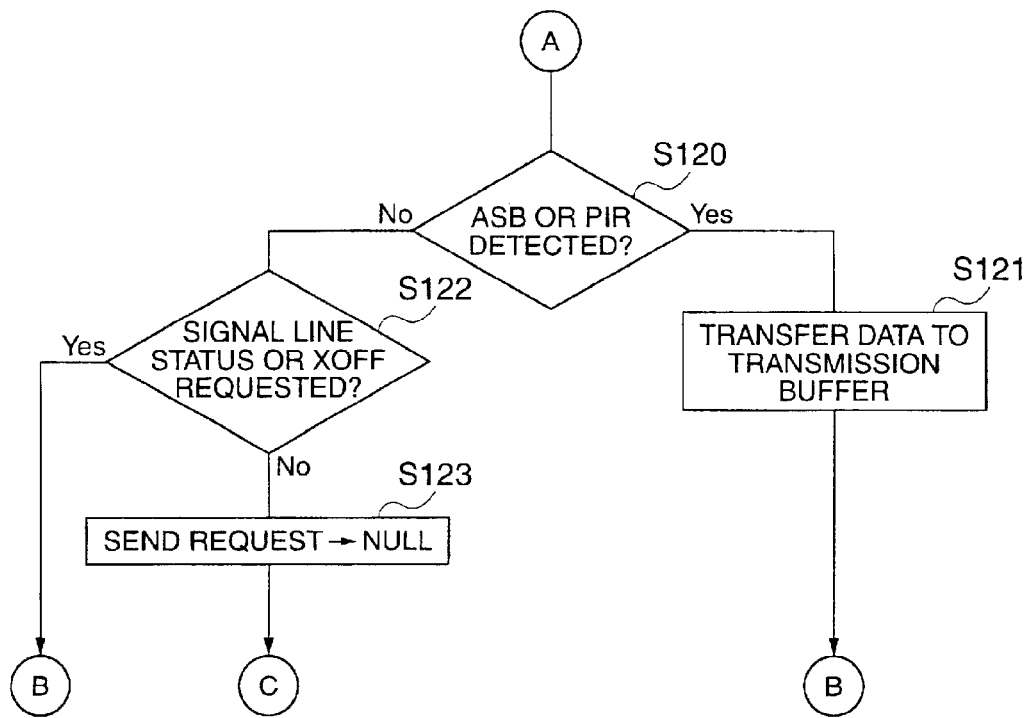
FIG. 4 is a flow chart of branch A from step S100 of FIG. 3.

A case in which there is no transmission data in the transmission buffer 12 is described next. If there is no data in transmission buffer 12, the procedure branches to A from step S100 in FIG. 3. FIG. 4 is a flow chart of the process for branch A.

If there is no transmission data in the printer 2, whether ASB status or PIR data is in ASB-dedicated buffer 14 or PIR-dedicated buffer 15 is first determined (S120). If ASB status or PIR data is found, the data is sent to the transmission buffer 12 (S121), and the procedure branches to B in FIG. 3. As described above in FIG. 3, the status data is sent after checking if the host 90 is busy (S101).

If ASB status or PIR data is not stored in dedicated buffer 14 or 15 (S120; no), whether there is a signal line status or XOFF signal send request is determined. If there is no send request (S122; no), the send request is set to null, control branches to C in FIG. 3, and the transmission process ends. If there is a send request (S122; yes), control branches to B in FIG. 3 and the XOFF signal or signal line status send process is run.

(Merge Process)

The merge process is next described in detail. The merge process is run (when with the configuration shown in FIG. 2) there is transmission data in the transmission buffer 12, data is already stored in ASB-dedicated buffer 14 or PIR-dedicated buffer 15, and additional ASB status data or PIR data is generated.

Figure 5:
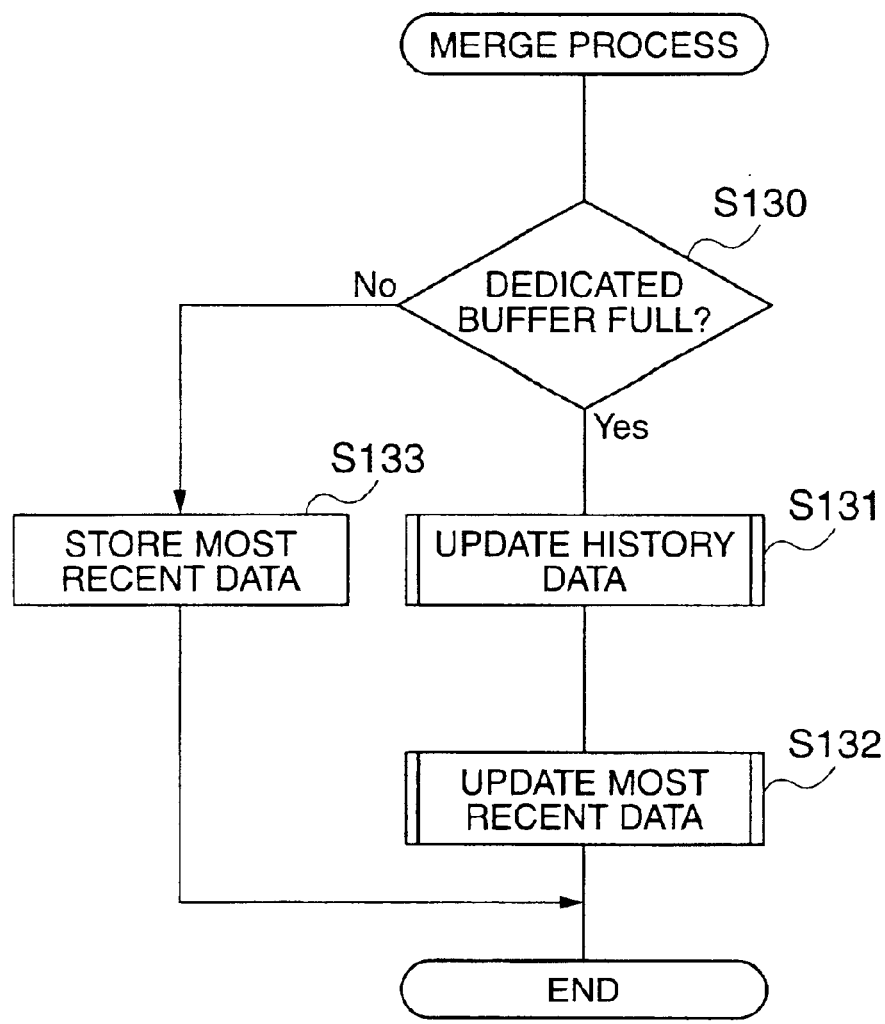
FIG. 5 is a flow chart showing the steps of the merge process of FIG. 2.

FIG. 5 is a flow chart of the merge process. First, if ASB status data or PIR data is output from the status monitor 80, the merge processor 16 (FIG. 2) first determines if the merge process is necessary. For example, if there is no space in the corresponding dedicated buffer 14 or 15, a merge process is deemed as necessary (S130). If there is space in the dedicated buffer (S130; no), the most recent data is stored to the corresponding dedicated buffer 14 or 15 (S133). If the order in which plural changes occurred in the data is not important because of the nature of the stored data, the merge process may be determined necessary even if there is space available in the dedicated buffer in order to reduce the amount of data sent to the host. In specific cases, such as when there is no space (S130; yes), the history data stored in the dedicated buffer is updated (S131), and the most recently occurring ASB status or PIR data is then stored to the corresponding dedicated buffer 14 or 15 (S132).

Figure 6:
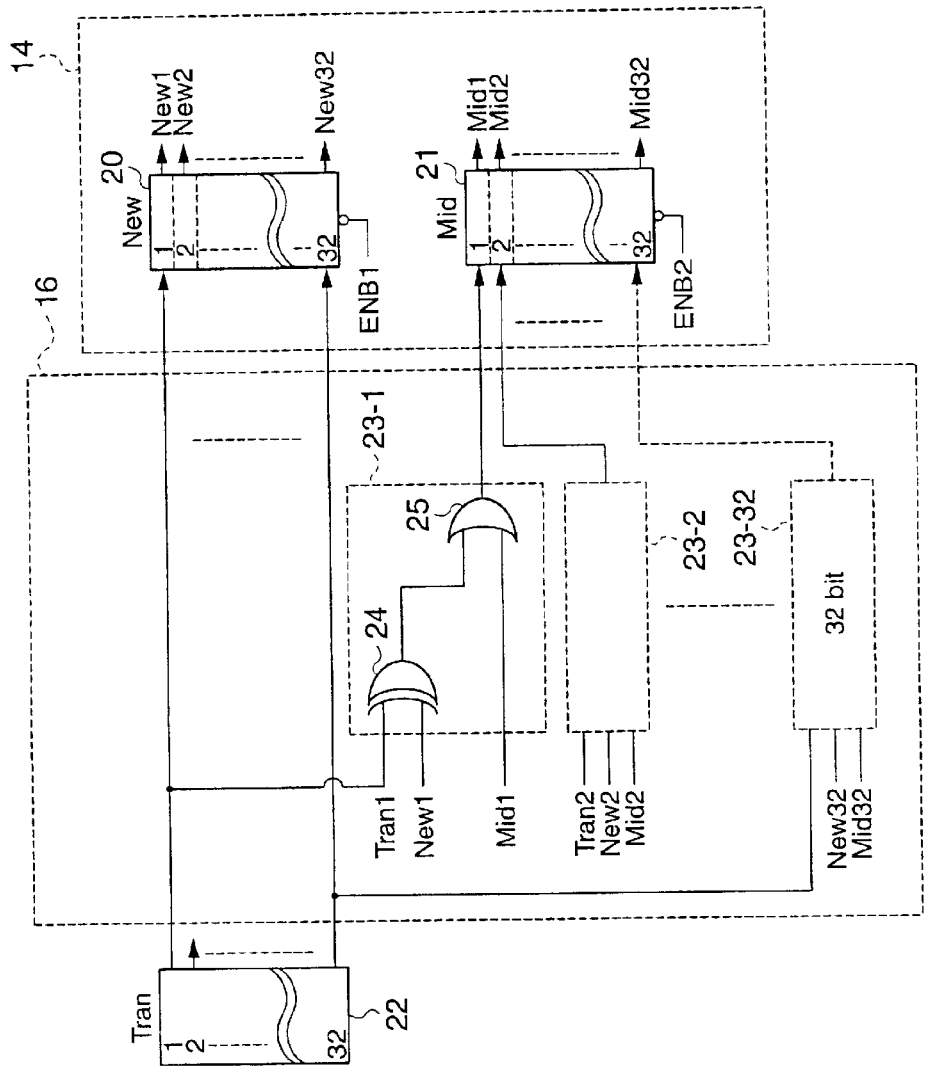
FIG. 6 is a function block diagram showing the basic configuration of the merge processor 16 and ASB-dedicated buffer 14 of FIG. 2.

Updating the history data related to the ASB status is described next with reference to FIG. 6. FIG. 6 is a function block diagram for describing the basic configuration of the merge processor 16 and ASB dedicated buffer 14. The ASB dedicated buffer 14 is preferably configured to include a 4-byte wide (32-bit) New ASB status data memory 20 and a 4-byte wide (32-bit) Mid status-change history memory 21.

The most recently generated ASB status data is stored in ASB status data memory 20. As further described below, information indicative of whether there was a change in the ASB status data sequentially sent to the merge processor, that is, the history data, is stored in the status-change history memory 21.

If space becomes available in the transmission buffer 12, ASB-History combination data constructed from the exclusive OR combination of the history data and most recently received ASB status data is generated and transferred to the transmission buffer 12, and is followed by the same most recently received ASB status data. By obtaining the exclusive OR of the history data and the most recently received ASB status data, ASB status bits that changed while transmission buffer 12 was unavailable will be coded in the ASB-History combination data as the inverse of the corresponding bit in the most recently received ASB status data, and any ASB status bit that did not change will be the same as the corresponding bit in the most recently received ASB status data. As a result, even if the ASB status data last sent to the host and the most recently received ASB status data sent to the host are the same, the host can be notified of, or determine itself, the ASB status data that underwent changes in between the last and most recent ASB status data transmissions.

Because of the nature of ASB status data, the presence of a change in any status bit is important but it is not necessary to know the sequence of changes. Furthermore, it is also most important to send the latest ASB status data to the host as soon as possible, and it is therefore desirable to reduce as much as possible the number of ASB status data transmissions that must be sent. The smallest number of data transmissions required to bring the ASB status data up-to-date can therefore be obtained by storing, for each status bit, the most recent state of the ASB status data and information indicative of whether there was a change in any of the status bits.

For the reasons described below information indicative of whether there was a change in the ASB status data is converted to ASB-History combination data generated by obtaining the exclusive OR of the history data and most recently received ASB status data from status monitor 80, and then sent to the host in the present embodiment. More specifically, the history data is not ASB status data and cannot be interpreted by the host as ASB status data even when it is sent to the host. More specifically, the host cannot determine if the data that is sent is "ASB status data" or is "history data," and the host therefore cannot recreate the history of changes in the ASB status data.

"Tran" buffer 22 in FIG. 6 is the most recently generated, and received, ASB status data transferred from status monitor 80, and consists of 4 bytes (32 bits). It should be noted that the ASB status data is described in this embodiment as consisting of 4 bytes, but ASB status data size (length) can be adjusted as necessary.

FIG. 6 is for describing an example of the merge function, and the timing and other control details are omitted. If there is space in the ASB-dedicated buffer 14 when newly generated ASB status data is transferred from the status monitor 80, it is stored directly to the ASB status data memory 20 in buffer 14 as New status bits 1–32 (i.e. New1 to New32), as described above. The initial value in the history memory 21 is zero, and the history memory 21 is cleared to zero after data New is sent to the transmission buffer 12.

The merge processor 16 has state change detectors 23-1 to 23-32 corresponding to each bit in the ASB status data. Each merge detector 23 has an exclusive OR gate 24 and an OR gate 25 configured to output a logic 1, i.e. logic high, if its corresponding bit in the newly transferred ASB status Data in Tran Buffer 22, for example bit Tran1, is different from its corresponding status data bit in the previously most recently received status data New, for example bit New1. The output of exclusive OR gate 24 is input to OR gate 25, which then obtains the logical OR with the corresponding bit in the history data Mid, in the present example bit Mid1.

Using the output from OR gates 25, it can therefore be determined if there was a change even once in any ASB status bit after the ASB status data is sent from ASB status data memory 20 to transmission buffer 12. Information indicating that there was a change is thus stored in the status-change history memory 21. The output from OR gate 25 is input to the corresponding bit in the status-change history memory 21, and the data in the status-change history memory 21 is updated at the ENB2 timing. A change in ASB status can therefore be determined from the output bits of the status-change history memory 21.

After the status-change history memory 21 is updated by applying ENB2, ENB1 goes active, and the transferred ASB status data bits Tran1 to Tran32 are stored in the ASB status data memory 20 as the most recently received ASB status data, New1 to New32. The ASB status data memory 20 and status-change history memory 21 can be provided as part of the ASB dedicated buffer 14. In this case the latest ASB status data and change history data is stored in ASB dedicated buffer 14, and when space becomes available in the transmission buffer 12, the exclusive OR combination of the most recently received ASB status data (New) in memory 20 and the current history data (Mid) in memory 21 is transferred to transmission buffer 12 followed by the latest ASB status data, New, from memory 20, in sequence, as described above.

These data changes are described more specifically below with reference to FIG. 7. FIG. 7 shows a sequence of changes in the most recently transferred ASB status data (Tran), the corresponding changes in history data (Mid), and most recently stored ASB status data (New). To simplify the description FIG. 7 shows one part (1 byte (8 bits)) of the ASB status data.

It is assumed that an ASB status data (DATA 1) is transferred under circumstances in which the ASB status data cannot be stored to transmission buffer 12 because transmission data is already stored in transmission buffer 12 and it is full. Because the ASB-dedicated buffer 14 does not require a merge process at this time, received Tran DATA 1 is stored directly into the ASB status data memory 20 as most recently received New DATA 1, and the merge process ends (S130 and S133 in FIG. 5).

Upon the next received ASB status data (Tran DATA 2), the merge process is started (S130, FIG. 5) and a change in history data (Mid) is generated. In this case bit 1 in the history data (Mid1) becomes 1 because New1, that is bit 1 in the most recently stored data New, is 1, and bit 1 (Tran1) in DATA 2 is 0; and Mid2 in the history data also becomes 1 because stored bit New2 (which is 0) is different from Tran 1 (which is 1) (S131, FIG. 5). The content of DATA 2 (Tran) is then stored as the most recently stored data New (S132, FIG. 5).

When DATA 3 is then transferred from status monitor 80, bit 3 (Mid3) in the history data likewise changes to 1 and bits 1 and 2 (Mid1, Mid2) remain set to 1. DATA 3 is then stored directly as the most recently stored data New.

When DATA 4 and DATA 5 are likewise received in sequence, bits 4 and 5 (Mid4, Mid5) of the history data change in sequence to 1, and the last generated data 5 (Tran) is stored as the most recently stored data New.

DATA 6 changes bit 1 (Tran 1) to "1" and bit 5 (Tran 5) to "0", but when data 6 is received, bits (Mid1, Mid5) in the history data remain set to 1 since they had already previously been changed and the history data is therefore not changed. DATA 6 is then stored as the most recently stored data New.

If transfer to the transmission buffer 12 becomes possible at this point, the exclusive OR combination of the most recently stored data New [00000001] and the history data Mid [00011111] is obtained as [00011110], and this ASB-History combination data [00011110] is first transferred to the transmission buffer 12. The most recently stored data New [00000001] is then sent to the transmission buffer 12. The ASB-History combination data thus shows which ASB status bits that are not set active in the most recently stored data New had previously been active in between the first stored DATA 1 and the most recently stored DATA 6.

The above embodiment has been described with reference to a case in which information about the sequence of change in the ASB status data is not necessary. If it is desirable to store (to the limits of the dedicated buffer capacity) information about the process of the changes, such as the order in which the status bits change, the configuration described below can be added to the embodiment described above. Specifically, a FIFO buffer is used as the dedicated buffer 14, and the received ASB status data (Tran) transferred from the status monitor 80 is input to this FIFO buffer 14. If the FIFO buffer 14 overflows, FIFO buffer output is input to the merge circuit 16 shown in FIG. 6, and the most recently stored ASB status data (New) and history data (Mid) are generated and stored to a specific address in RAM. It will be noted that the most recently received ASB status data transferred to the merge circuit in this case is not the first data sent to transmission buffer 12 when buffer 12 becomes available. This is because FIFO buffer 14 will contain previously received data that is transferred to transmission buffer 12 prior to the data generated by merge circuit 16. When the data generated by merge circuit 16 is transferred to transmission buffer 12, the ASB-History combination data is generated by the logical XOR combination of the history data (Mid) and most recently stored ASB status data (New) as described in the above embodiment, and the most recently stored ASB status data (New) is transferred in the output data sequence of the FIFO buffer.

Furthermore, the PIR data is data enabling the host to determine the progress of a particular process, and an intermediate history thereof is therefore not necessary. Therefore, PIR data in the PIR-dedicated buffer that has not been sent to transmission buffer 12 can be overwritten with the most recently received PIR data.

It should be noted that the above preferred embodiment has been described with reference only to sending data from a printer or other terminal device to a host, but if an independently operating interface means is provided in the terminal device, data communication with the interface means is handled in the same way as communication with the host. In other words, the present invention is directed to transmission control for sending data in 1-byte units to an interface means in a terminal device.

Effects of the Invention

As described above, by providing a dedicated buffer for continuously generated status data and storing a history of status changes with a configuration whereby only the most recent status data and the status change history data are sent to the host, the present invention is able to reduce the buffer needed for transmission and greatly reduce the communication load.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A transmission control device for a terminal apparatus, comprising:

a transmission buffer for temporarily storing continuously generated status data;

a dedicated buffer for temporarily storing at least the most recent status data and a history data when said transmission buffer is not empty;

a history data generating unit for generating said history data to indicate a change in the most recent status data transferred to said dedicated buffer; and a control unit for controlling the storing to said dedicated buffer of the most recently transferred status data when said transmission buffer is not empty, and for responding to said transmission buffer ceasing to be full by producing a history-summary data using at least said history data and transferring the status data stored in said dedicated buffer and said history-summary data to said transmission buffer, and for transmitting the status data and history-summary data stored in said transmission buffer.

2. The transmission control device of claim 1, wherein said history data indicates state changes from a not-actuated state to an actuated state in any status bit in the status data transferred to said dedicated buffer.

3. The transmission control device of claim 2, wherein said history data is generated by producing the bit-wise exclusive OR combination of the current contents of said dedicated buffer with the most recent status data transferred to said dedicated buffer, and applying the result to a bit-wise logical OR combination with the current value of said history data, the result of said bit-wise logical OR being assigned as the new values of said history data.

4. The transmission control device of claim 1, wherein said history-summary data is produced using a logical combination of said history data and the status data stored in said dedicated buffer.

5. The transmission control device of claim 4, wherein the most recently transferred status data is stored into said dedicated buffer by said control unit after said history data generating unit generating said history data in response to the most recently transferred status data.

6. The transmission control device of claim 4, wherein said logical combination is the exclusive OR combination of said history data and the status data stored in said dedicated buffer.

7. The transmission control device of claim 1, wherein said control unit transfers the status data stored in said dedicated buffer and said history-summary data to said transmission buffer for successive transmission one after the other.

8. The transmission control device of claim 1, wherein said dedicated buffer is a FIFO-type buffer, and wherein said history data generating unit and at least part of said control unit are collectively identified as a merge-circuit;

said dedicated buffer successively storing newly transferred status data in FIFO order without processing of the newly transferred status data by said merge circuit until said dedicated buffer is full;

said merge circuit being actuated to process the most recent status data transferred to said dedicated buffer in response to said dedicated buffer becoming full.

9. The transmission control device of claim 8, wherein said control unit transfers said history-summary data to said transmission via said dedicated buffer, said dedicated buffer being effective for transferring said history-summary data to said transmission buffer in FIFO order.

10. A transmission control device for a terminal apparatus as described in claim 1, wherein said dedicated buffer includes a first-in, first-out (FIFO) type buffer and a separate memory space;

said FIFO-type buffer having a plurality of storage stages and being effective for storing the status data sent to said dedicated buffer when said transmission buffer is full until said FIFO-type buffer itself becomes full;

said separate memory being effective for storing said history data and for storing the status data sent to said dedicated buffer when both said transmission buffer and said FIFO-type buffer are full;

said history data generating unit generating said history data based on the most recent status data transferred to said dedicated buffer and the current status data stored in said separate memory space; and said control unit transferring status data from said FIFO-type buffer to said transmission buffer in FIFO order when no history data is stored in said second memory space.

11. The transmission control device of claim 10, wherein status data and history summary data is transferred from said second memory space to said transmission buffer via said FIFO-type buffer in FIFO order.

12. A transmission control device for a terminal apparatus as described in claim 1, wherein the status data stored in said dedicated buffer and for which history data is generated by said history data generating unit consists of specific predetermined status data types.

13. A transmission control device for a terminal apparatus as described in claim 1, wherein:

each data bit of the status data identifies a different status condition; and the generating of history data by said history data generating unit includes sequentially calculating the bitwise logical OR combination of identified bit status changes in the newly received status data with the current history data.

14. A transmission control device for a terminal apparatus as described in claim 1, further comprising:

a history data storage unit for storing said history data; and wherein said control unit further controls the storing of said history data to said history data storage unit, whereby said history data is not stored in said dedicated buffer.

15. A transmission control device for a terminal apparatus as described in claim 1, wherein said dedicated buffer includes a first dedicated sub-buffer and a second dedicated sub-buffer; said first dedicated sub-buffer being of a first-in, first-out (FIFO) type and being effective for storing the status data sent to said dedicated buffer when said transmission buffer is full, said FIFO-type first dedicated sub-buffer having a plurality of storage stages and being effective for overwriting its last storage stage with newly received status data when all of its previous storage stages are full;

said second dedicated sub-buffer being effective for storing said history data;

said history data generating unit generating said history data based on the most recent status data transferred to the last storage stage of said first dedicated sub-buffer and the current contents of the last stage of said first dedicated sub-buffer; and said control unit transferring status data from said first dedicates sub-buffer and history data from said second dedicated sub-buffer to said transmission buffer when the history data is stored in said second dedicated sub-buffer, and transferring status data in first-in, first-out order from said first dedicated sub-buffer to said transmission buffer when history data is not stored in said second dedicated sub-buffer.

16. A printer having an auto status back, ASB, function to generate status data, wherein said printer further generates change data that indicates status changes between earlier status data previously sent to a host device and current status data generated by sai ASB function, wherein said change data is transmitted when said current status data is transmitted to said host device.

17. A printer having an auto status back, ASB, function to generate status data, said printer comprising:

- a first memory for storing a first status data previously transmitted to a host device;
- a second memory for storing a second status data currently generated by said ASB function;
- a calculation unit for producing change data showing status change between said first status data and said second status data;
- a transmission devise for transmitting said second status data and said change data.

18. A terminal devise adapted to be connected to a host, comprising:

- an auto status back function to automatically generate status data in response to a status change and to send status data to the host;
- a change data generate for generating change data that indicate change between currently generated status data and the status data that were last sent to the host;
- wherein said change data is transmitted to the host when said currently generated status data is transmitted to the host.

* * * * *